US009376327B2

(12) United States Patent
Morikawa et al.

(10) Patent No.: US 9,376,327 B2
(45) Date of Patent: Jun. 28, 2016

(54) CERIA-ZIRCONIA BASE COMPOSITE OXIDE, METHOD FOR PRODUCING THE SAME, AND CATALYST FOR PURIFICATION OF EXHAUST GAS USING THE CERIA-ZIRCONIA BASE COMPOSITE OXIDE (75) Inventors: Akira Morikawa, Nagoya (JP); Kae Yamamura, Nagoya (JP); Akihiko Suda, Seto (JP); Naoki Takahashi, Nagoya (JP); Oji Kuno, Nagoya (JP); Takeshi Nobukawa, Toyota (JP); Akiya Chiba, Kakegawa (JP); Ryuta Fujii, Kakegawa (JP)

(73) Assignees: KABUSHIKI KAISHA TOYOTA CHUO KENKYUSHO, Aichi (JP); TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 778 days.

(21) Appl. No.: 13/640,237

(22) PCT Filed: Apr. 12, 2011

(86) PCT No.: PCT/JP2011/059478
§ 371 (c)(1),
(2), (4) Date: Oct. 9, 2012

(87) PCT Pub. No.: WO2011/129460
PCT Pub. Date: Oct. 20, 2011

(65) Prior Publication Data
US 2013/0029840 A1      Jan. 31, 2013

(30) Foreign Application Priority Data
Apr. 13, 2010   (JP) ................. 2010-092551

(51) Int. Cl.
*B01J 23/00*  (2006.01)
*B01J 23/10*  (2006.01)
(Continued)

(52) U.S. Cl.
CPC ............... *C01G 25/00* (2013.01); *B01J 35/04* (2013.01); *C04B 35/486* (2013.01);
(Continued)

(58) Field of Classification Search
USPC .................... 502/304, 100, 300, 302
See application file for complete search history.

(56) References Cited

U.S. PATENT DOCUMENTS 5,571,492 A  *  11/1996  Yao .................. B01J 20/06
                                              423/263
5,580,536 A  *  12/1996  Yao .................. B01J 23/10
                                              264/614
(Continued)

FOREIGN PATENT DOCUMENTS

CN       101146612 A     3/2008
EP       0 708 066 A1    4/1996
(Continued)

OTHER PUBLICATIONS

Sasaki, "Study on Oxygen Storage/Release Performance and Crystal Structure of Ceria-Zirconia Compounds with Different Ce/Zr Ratios," Thesis, Chapter 7, pp. 150-170, 2004 (With Translation).
(Continued)

*Primary Examiner* — James McDonough
(74) *Attorney, Agent, or Firm* — Oliff PLC (57) ABSTRACT

A ceria-zirconia base composite oxide contains a composite oxide of ceria and zirconia. In the ceria-zirconia base composite oxide, a content ratio between cerium and zirconium in the composite oxide is in a range from 43:57 to 48:52 in terms of molar ratio ([cerium]:[zirconium]). An intensity ratio of a diffraction line at $2\theta=14.5°$ to a diffraction line at $2\theta=29°$ {I(14/29) value} and an intensity ratio of a diffraction line at $2\theta=28.5°$ to the diffraction line at $2\theta=29°$ {I(28/29) value}, which are calculated from an X-ray diffraction pattern obtained by an X-ray diffraction measurement using CuKα after heating under a temperature condition of 1100° C. in air for 5 hours, respectively satisfy the following conditions: I(14/29) value≥0.015, and I(28/29) value≤0.08.

10 Claims, 1 Drawing Sheet (51) Int. Cl.

| | | |
|---|---|---|
| *B01J 21/00* | (2006.01) | |
| *B01J 25/00* | (2006.01) | |
| *B01J 29/00* | (2006.01) | |
| *C01G 25/00* | (2006.01) | |
| *B01J 35/04* | (2006.01) | |
| *C04B 35/486* | (2006.01) | |
| *C04B 35/626* | (2006.01) | |

(52) U.S. Cl.
CPC ........ *C04B 35/6262* (2013.01); *C01P 2002/30* (2013.01); *C01P 2002/36* (2013.01); *C01P 2002/50* (2013.01); *C01P 2002/52* (2013.01); *C01P 2002/74* (2013.01); *C01P 2004/03* (2013.01); *C01P 2004/61* (2013.01); *C01P 2006/12* (2013.01); *C04B 2235/3229* (2013.01); *C04B 2235/5409* (2013.01); *C04B 2235/5436* (2013.01); *C04B 2235/604* (2013.01); *C04B 2235/652* (2013.01); *C04B 2235/656* (2013.01); *C04B 2235/663* (2013.01); *C04B 2235/95* (2013.01)

(56) References Cited

U.S. PATENT DOCUMENTS

| | | | | |
|---|---|---|---|---|
| 5,582,785 | A * | 12/1996 | Yao | B01J 23/10 264/118 |
| 6,605,565 | B1 * | 8/2003 | Zhang | B01D 53/945 501/152 |
| 2003/0050189 | A1 * | 3/2003 | Morikawa | B01J 23/63 502/304 |
| 2004/0126298 | A1 | 7/2004 | Stark et al. | |
| 2007/0155624 | A1 * | 7/2007 | Wakita | B01D 53/945 502/304 |
| 2009/0124491 | A1 | 5/2009 | Miura et al. | |

FOREIGN PATENT DOCUMENTS

| | | |
|---|---|---|
| EP | 1 287 876 A2 | 3/2003 |
| JP | A-08-103650 | 4/1996 |
| JP | A-08-109020 | 4/1996 |
| JP | A-08-109021 | 4/1996 |
| JP | A-2003-277059 | 10/2003 |
| JP | WO 2006/030763 A1 | 3/2006 |
| JP | A-2009-084061 | 4/2009 |

OTHER PUBLICATIONS

Sasaki et al., "Material Design and Crystal Structure Analysis Based on Ordered Arrangement of Ceria-Zirconia Solid Solution," *Proceedings of 2006 Spring Meeting of the Japan Institute of Metals*, p. 140, 2006 (With Translation).

Sugiura, "Oxygen storage materials for automotive catalysts: ceria-zirconia solid solutions," *Catalysis Surveys from Asia*, vol. 7, No. 1, pp. 77-87, Apr. 1, 2003.

Kishimoto et al., "Crystal Structure of metastable $_k$-CeZrO$_4$ phase possessing an ordered arrangement of Ce and Zr ions," *Journal of Alloys and Compounds*, vol. 312, pp. 94-103, 2000.

Masui et al., "Reduction Behavior of CeO$_2$—ZrO$_2$ Solid Solution Prepared from Cerium Zirconyl Oxalate," *Chem. Mater.*, vol. 10, No. 12, pp. 4005-4009, 1998.

Suda et al., "Improvement of Oxygen Storage Capacity of CeO$_2$—ZrO$_2$ Solid Solution by Heat Treatment in Reducing Atmosphere," *Journal of the Ceramic Society of Japan*, vol. 110, No. 2, pp. 126-130, 2002.

Sasaki et al., "Flaming Oxidation of Reduced CeO$_2$—ZrO$_2$ Solid Solution in the Near-Room-Temperature Range," *Journal of the Ceramic Society of Japan*, vol. 110, No. 10, pp. 899-903, 2002.

Sasaki et al., "Oxygen Absorption Behavior of Ce$_2$Zr$_2$O$_{7+x}$ and Formation of Ce$_2$Zr$_2$O$_{7.5}$," *Journal of the Ceramic Society of Japan*, vol. 111, No. 6, pp. 382-385, 2003.

Written Opinion of the International Searching Authority issued in Application No. PCT/JP2011/059478; Dated Jun. 5, 2012.

International Preliminary Report on Patentability issued in Application No. PCT/JP2011/059478; Dated Aug. 13, 2012.

International Search Report issued in Application No. PCT/JP2011/059478; Dated Aug. 19, 2011.

Oct. 11, 2014 Office Action issued in Chinese Application No. 201180019058.5.

* cited by examiner

CERIA-ZIRCONIA BASE COMPOSITE OXIDE, METHOD FOR PRODUCING THE SAME, AND CATALYST FOR PURIFICATION OF EXHAUST GAS USING THE CERIA-ZIRCONIA BASE COMPOSITE OXIDE

TECHNICAL FIELD

The present invention relates to a ceria-zirconia base composite oxide, a method for producing the same, and a catalyst for purification of exhaust gas using the ceria-zirconia base composite oxide.

BACKGROUND ART

Conventionally, composite oxides containing various metal oxides have been utilized as a support, a co-catalyst, and the like for a catalyst for purification of exhaust gas. As a metal oxide in such a composite oxide, ceria is favorably used because ceria is capable of storing and releasing oxygen according to the oxygen partial pressure in the atmosphere (i.e., has an oxygen storage capacity). In addition, recently, various kinds of composite oxides containing ceria have been studied, and there have been disclosed various ceria-zirconia base composite oxides and methods for producing the same.

For example, Japanese Unexamined Patent Application Publication No. Hei 8-109020 (Patent Literature 1) discloses a composite oxide comprising cerium oxide, zirconium oxide and hafnium oxide, in which the content of cerium oxide is 4.99 to 98.99% by mass, that of zirconium oxide is 1 to 95% by mass, and that of hafnium oxide is 0.01 to 20% by mass. The composite oxide includes p' phase as a crystal phase. In addition, as a method for producing the composite oxide described in Patent Literature 1, there is disclosed a method in which a primary composite oxide containing cerium oxide, zirconium oxide and hafnium oxide is subjected to a reduction treatment at 600 to 1000° C. for 0.5 to 10 hours and then to a heating-oxidation treatment.

Moreover, Japanese Unexamined Patent Application Publication No. Hei 8-109021 (Patent Literature 2) discloses a composite oxide comprising cerium oxide, zirconium oxide and hafnium oxide, in which the content of cerium oxide is 4.99 to 98.89% by mass, that of zirconium oxide is 1 to 95% by mass, and that of hafnium oxide is 0.01 to 20% by mass, the composite oxide further comprising 0.1 to 10% by mass of titanium oxide, tungsten oxide, nickel oxide, copper oxide, iron oxide, aluminum oxide, silicon oxide, beryllium oxide, magnesium oxide, calcium oxide, strontium oxide, barium oxide, an oxide of a rare earth metal other than cerium, or a mixture thereof. The composite oxide includes φ phase as a crystal phase. In addition, as a method for producing the composite oxide described in Patent Literature 2, there is disclosed a method in which cerium oxide, zirconium oxide and hafnium oxide are mixed with titanium oxide, tungsten oxide, nickel oxide, copper oxide, aluminum oxide, silicon oxide, beryllium oxide, magnesium oxide, calcium oxide, strontium oxide, barium oxide, an oxide of a rare earth metal other than cerium or a mixture thereof, followed by compression-molding and then calcination at 700 to 1500° C. (preferably 900 to 1300° C.) to form φ phase.

Further, Japanese Unexamined Patent Application Publication No. Hei 8-103650 (Patent Literature 3) discloses a method for producing a composite oxide, characterized in that an composite oxide containing cerium oxide, zirconium oxide and hafnium oxide as essential components is subjected to a heating-reduction treatment and then to a heating-oxidation treatment. As a favorable method for the heating-reduction treatment, there is disclosed a method including heating at 600 to 1000° C. for 0.5 to 10 hours in an atmosphere of a reducing gas.

Additionally, International Publication No. WO2006/030763 (Patent Literature 4) discloses a method for producing a cerium-zirconium base composite oxide, characterized by comprising: mixing a cerium raw material containing cerium oxide with a zirconium raw material containing zirconium oxide at a predetermined ratio to prepare a raw-material mixture in advance; melting the mixture at a temperature equal to or above the melting point; then cooling a melted product thus obtained to form an ingot; subsequently crushing the ingot to obtain a powder; removing strain in a crystal of the powder under heating as desired; and further pulverizing the powder.

Furthermore, "Study on Oxygen Storage/Release Performance and Crystal Structure of Ceria-Zirconia Compounds with Different Ce/Zr Ratios" (Non Patent Literature 1) in the thesis by Mr. Iwao Sasaki in 2004, pp. 150 to 170, and "Material Design and Crystal Structure Analysis Focusing on Orderly Arrangement of Ceria-Zirconia Solid Solution" described at page 140 in Proceedings of the 2006 Spring Meeting of the Japan Institute of Metals (Non Patent Literature 2) disclose a ceria-zirconia base composite oxide obtained by subjecting a ceria-zirconia base composite oxide prepared by a coprecipitation method to a reduction treatment at 1673K (1400° C.).

However, a ceria-zirconia base composite oxide obtained by adopting production methods as described in Patent Literatures 1 to 4 and Non Patent Literatures 1 to 2 above is not produced so as to enhance the durability in a high-temperature, oxidizing atmosphere. The heat resistance is not always sufficient. For this reason, such conventional ceria-zirconia base composite oxides do not always have sufficient oxygen storage capacity after exposure to high temperature for an extended period of time.

Furthermore, Japanese Unexamined Patent Application Publication No. 2009-84061 (Patent Literature 5) discloses a ceria-zirconia base composite oxide which has 500 or more of an orderly arranged pyrochlore-type phase remained after heating under a temperature condition of 1000° C. in air for hours. The ceria-zirconia base composite oxide is obtained by subjecting a ceria-zirconia base composite oxide powder having a content ratio between ceria and zirconia in a range from 55:45 to 49:51 in terms of molar ratio ([ceria]:[zirconia]) to a reduction treatment under a temperature condition from 1500° C. or higher to 1900° C. or lower and then to an oxidation treatment.

CITATION LIST

Patent Literature

[PTL 1] Japanese Unexamined Patent Application Publication No. Hei 8-109020
[PTL 2] Japanese Unexamined Patent Application Publication No. Hei 8-109021
[PTL 3] Japanese Unexamined Patent Application Publication No. Hei 8-103650
[PTL 4] International Publication No. WO2006/030763
[PTL 5] Japanese Unexamined Patent Application Publication No. 2009-84061

Non Patent Literature

[NPL 1] "Study on Oxygen Storage/Release Performance and Crystal Structure of Ceria-Zirconia Compounds with Different Ce/Zr Ratios," thesis, written by Iwao Sasaki, published in 2004, pp. 150 to 170

[NPL 2] "Material Design and Crystal Structure Analysis Focusing on Orderly Arrangement of Ceria-Zirconia Solid Solution," co-written by Iwao Sasaki, Hiroshi Nozaki, et al., Proceedings of 2006 Spring Meeting of the Japan Institute of Metals, published in 2006, p. 140

SUMMARY OF INVENTION

Technical Problem

The invention described in Patent Literature 5 above provides a ceria-zirconia base composite oxide having high heat resistance and being capable of exhibiting an excellent oxygen storage capacity even after exposure to high temperature for an extended period of time. However, recently, the level of the properties demanded for a catalyst for purification of exhaust gas is higher than ever. A ceria-zirconia base composite oxide is demanded to have sufficiently higher heat resistance and to be capable of exhibiting more sufficiently excellent oxygen storage capacity even after exposure to high temperature for an extended period of time.

The present invention has been made in consideration of the above-described problems in the conventional techniques. An object of the present invention is to provide: a ceria-zirconia base composite oxide, a method for producing the same, and a catalyst for purification of exhaust gas using the ceria-zirconia base composite oxide, the ceria-zirconia base composite oxide having sufficiently higher heat resistance and being capable of exhibiting more sufficiently excellent oxygen storage capacity even after exposure to high temperature for an extended period of time than a conventional ceria-zirconia base composite oxide obtained by adopting a production method as described in Patent Literature 5 above.

Solution to Problem

The present inventors have earnestly studied in order to achieve the above object. As a result, the inventors have revealed that, in contrast to the common knowledge of those skilled in the art, if a content ratio between cerium and zirconium in a ceria-zirconia solid solution powder used is in a range from 43:57 to 48:52 in terms of molar ratio ([cerium]: [zirconium]), by compression-molding the ceria-zirconia solid solution powder at a predetermined pressure followed by a reduction treatment under a predetermined temperature condition, surprisingly a ceria-zirconia base composite oxide thus obtained has significantly improved heat resistance and becomes capable of exhibiting a considerably high level of excellent oxygen storage capacity even after exposure to high temperature for an extended period of time. This discovery has led the inventors to complete the present invention.

Specifically, as described also in Non Patent Literature 1 and Patent Literature 5 above, it has been a common knowledge of those skilled in the art that if the content of ceria in a composite oxide of ceria and zirconia is less than 49 mol %, an excessive of zirconia ($ZrO_2$) other than a portion of zirconia that combines with ceria ($CeO_2$) to form $Ce_2Zr_2O_7$ becomes free $ZrO_2$, and such free $ZrO_2$ is in a phase not involved in the performance of the oxygen storage capacity; thus, the oxygen storage capacity tends to be reduced. In contrast, in the present invention, by compression-molding at a pressure of 400 to 3500 kgf/cm$^2$ a ceria-zirconia solid solution powder in which a content ratio between cerium and zirconium is in a range from 43:57 to 48:52 in terms of molar ratio ([cerium]:[zirconium]), followed by a reduction treatment under a temperature condition of 1450 to 2000° C., surprisingly a ceria-zirconia base composite oxide thus obtained has significantly improved heat resistance and exhibits a considerably high level of excellent oxygen storage capacity even after exposure to high temperature for an extended period of time.

A method for producing a ceria-zirconia base composite oxide comprising a composite oxide of ceria and zirconia of the present invention is a method comprising the step of:

obtaining the ceria-zirconia base composite oxide by compression-molding at a pressure of 400 to 3500 kgf/cm$^2$ a ceria-zirconia solid solution powder in which a content ratio between cerium and zirconium is in a range from 43:57 to 48:52 in terms of molar ratio ([cerium]:[zirconium]), followed by a reduction treatment under a temperature condition of 1450 to 2000° C.

Moreover, in a ceria-zirconia base composite oxide comprising a composite oxide of ceria and zirconia of the present invention that now can be obtained by such a production method of the present invention, a content ratio between cerium and zirconium in the composite oxide is in a range from 43:57 to 48:52 in terms of molar ratio ([cerium]:[zirconium]), and an intensity ratio of a diffraction line at $2\theta=14.5°$ to a diffraction line at $2\theta=29°$ {I(14/29) value} and an intensity ratio of a diffraction line at $2\theta=28.5°$ to the diffraction line at $2\theta=29°$ {I(28/29) value}, which are calculated from an X-ray diffraction pattern obtained by an X-ray diffraction measurement using CuKα after heating under a temperature condition of 1100° C. in air for 5 hours, respectively satisfy the following conditions:

I(14/29) value≥0.015, and

I(28/29) value≤0.08.

Furthermore, a catalyst for purification of exhaust gas of the present invention comprises the ceria-zirconia base composite oxide of the present invention.

In the ceria-zirconia base composite oxide of the present invention, a crystal phase having an orderly arranged structure of cerium ions and zirconium ions is formed in the composite oxide.

In addition, in the ceria-zirconia base composite oxide of the present invention, preferably (i) an average value of percentages of areas occupied by particles is 50% or more in a field of view (magnification 500×) of a scanning electron microscope, and/or (ii) an average value (number-based average value) of diameters of crystal grains is 2.2 to 4.5 μm in a field of view (magnification 500×) of a scanning electron microscope.

The method for producing a ceria-zirconia base composite oxide of the present invention preferably further comprises the step of, after the reduction treatment, subjecting the ceria-zirconia base composite oxide to an oxidation treatment.

Note that, in the present invention, an I(14/29) value and an I(28/29) value are respectively an intensity ratio of a diffraction line at $2\theta=14.5°$ to a diffraction line at $2\theta=29°$ {I(14/29) value} and an intensity ratio of a diffraction line at $2\theta=28.5°$ to the diffraction line at $2\theta=29°$ {I(28/29) value}, which are calculated from an X-ray diffraction pattern obtained by an X-ray diffraction measurement using CuKα after heating of a ceria-zirconia base composite oxide, that is, a measurement target, under a temperature condition of 1100° C. in air for 5 hours. As the method of the X-ray diffraction measurement, adopted is a method in which the measurement is performed with a measuring instrument manufactured by Rigaku Corporation under the product name "RINT2100" using CuKα radiation under conditions of 40 KV, 30 mA, and $2\theta=2°/min$.

Here, the diffraction line at 2θ=14.5° is a diffraction line derived from the (111) plane of the ordered phase (κ phase). The diffraction line at 2θ=29° is a diffraction line derived from the (222) plane of the ordered phase and overlapping a diffraction line derived from the (111) plane of the ceria-zirconia solid solution (CZ solid solution). Thus, by calculating the I(14/29) value that is the intensity ratio between the two diffraction lines, an index is defined which represents the percentage (remaining percentage) of the ordered phase maintained. Note that when the intensity of a diffraction line is calculated, an average diffraction line intensity at 2θ=10° to 12° which is a background value is subtracted from a value of each diffraction line intensity. In addition, a κ phase ($Ce_2Zr_2O_8$) which is completely filled with oxygen and a pyrochlore phase ($Ce_2Zr_2O_7$) from which oxygen is completely removed are each a perfect ordered phase. The I(14/29) value of the κ phase and the I(14/29) value of the pyrochlore phase are respectively 0.04 and 0.05, which are calculated from the corresponding PDF cards (PDF2: 01-070-4048 for the κ phase, PDF2: 01-075-2694 for the pyrochlore phase). Further, the ordered phase, that is, a crystal phase having an orderly arranged structure formed of cerium ions and zirconium ions, has an arrangement structure (φ' phase-type orderly arranged phase (the φ' phase is the same phase as the κ phase): a superlattice structure that occurs in the structure of calcium fluoride) of a crystal which has peaks at 2θ-angle positions of 14.5°, 28°, 37°, 44.5° and 51° in an X-ray diffraction pattern obtained by an X-ray diffraction measurement using CuKα. Not that the "peak" herein refers to one having a height of 30 cps or more, the height being from a baseline to a peak top.

Moreover, the diffraction line at 2θ=28.5° is a diffraction line derived from the (111) plane of $CeO_2$ as a single component. By calculating the I(28/29) value that is the intensity ratio between two diffraction lines of the diffraction line at 2θ=28.5° and the diffraction line at 2θ=29°, an index is defined which represents the degree of phase separation of $CeO_2$ from a composite oxide.

Furthermore, in the present invention, an average value of percentages of areas occupied by particles is an average value of percentages of areas occupied by particles in fields of view (each magnification 500×, in a region of 240 μm×240 μm) obtained by observing five arbitrary spots in cross sections of particles of a ceria-zirconia base composite oxide, that is, a measurement target, with a scanning electron microscope (SEM). Note that, in the field of view, a portion occupied by a particle is observed as a white or gray region in a backscattered electron image. Additionally, in the field of view, crystal grains are observed in the form of: a particle distinguished by grain boundaries or a particle that exists distinctly separately from other particles. It should be noted, however, that there are two possible forms in a crystal grain; the first one is a case where a primary particle is grown as a single crystal with a uniform orientation, and the second one is a case where a crystal having nanoscale subdomains with different orientations looks like a single crystal due to a problem such as observation angle of SEM. Since it is very difficult to determine which form a certain crystal grain has, any of a particle distinguished by observable grain boundaries and a particle that exists independently from other particles is regarded as a crystal grain in the present invention.

In addition, in the present invention, an average value (number-based average value) of diameters of crystal grains is an average value of diameters of crystal grains calculated based on the number in fields of view (each magnification 500×, in a region of 240 μm×240 μm) obtained by observing five arbitrary spots in cross sections of particles of a ceria-zirconia base composite oxide, that is, a measurement target, with a scanning electron microscope (SEM). Note that, in the field of view, crystal grains are observed, as described above, in the form of: a particle distinguished by grain boundaries or a particle that exists distinctly separately from other particles. Additionally, a diameter of a crystal grain herein refers to, when the cross section is not circular, a diameter of a minimum circumscribed circle.

Although it is not known exactly why the above object is achieved by the ceria-zirconia base composite oxide of the present invention that now can be obtained by the production method of the present invention, the inventors speculate as follows. Specifically, firstly, it has been heretofore a general knowledge of those skilled in the art that as a ceria-zirconia base composite oxide becomes a composition rich in zirconium in the content ratio between cerium and zirconium, an excessive of zirconia ($ZrO_2$) other than a portion of zirconia that combines with ceria ($CeO_2$) to form $Ce_2Zr_2O_7$ becomes free zirconia not involved in the performance of the oxygen storage capacity. In addition, the percentage of the ordered phase maintained is reduced. As a result, the oxygen storage capacity tends to be reduced accordingly. However, if the content ratio between cerium and zirconium in the composite oxide is in a range from 43:57 to 48:52 in terms of molar ratio ([cerium]:[zirconium]), the effect of improving the stability of the composite oxide by suppression of phase separation of ceria outweighs the reduction in the oxygen storage capacity due to the above-described enrichment of the composition with zirconium. Thus, the present inventors speculate that the composite oxide has improved heat resistance and exhibits more sufficiently excellent oxygen storage capacity even after exposure to high temperature for an extended period of time.

Moreover, in the present invention, the ceria-zirconia solid solution powder in which a content ratio between cerium and zirconium is in a range from 43:57 to 48:52 in terms of molar ratio ([cerium]:[zirconium]) is compression-molded at a pressure of 400 to 3500 kgf/cm² followed by the reduction treatment under a temperature condition of 1450 to 2000° C. By molding at a predetermined pressure a composite oxide before reduction in this manner, grain boundaries within the powder are controlled, and particles becomes more likely to come into contact with one another, encouraging crystal growth to proceed during the reduction treatment. At the same time, rearrangement of ions is also facilitated, encouraging formation of the ordered phase. Further, since particles are thereby densely packed, the probability that particles come into contact with one another becomes relatively uniform, and grain growth proceeds in a concurrent manner, accordingly improving the stability as a crystal. From these speculations, the present inventors conclude that, by subjecting a composite oxide molded at a predetermined pressure to the reduction treatment at a predetermined temperature in the above-described manner, excessive grain growth and transition in the crystal phase of particles are sufficiently suppressed during the subsequent high-temperature durability test. Consequently, together with the aforementioned effect of improving the stability of the composite oxide by the suppression of the phase separation of ceria, a high oxygen storage capacity is retained even after exposure to high temperature for an extended period of time.

Advantageous Effects of Invention

According to the present invention, it is possible to provide a ceria-zirconia base composite oxide, a method for producing the same, and a catalyst for purification of exhaust gas using the ceria-zirconia base composite oxide, the ceria-zirconia base composite oxide having sufficiently higher heat resistance and being capable of exhibiting more sufficiently excellent oxygen storage capacity even after exposure to high temperature for an extended period of time.

DESCRIPTION OF EMBODIMENTS

Hereinafter, the present invention will be described in detail according to the preferred embodiments.

Firstly, a ceria-zirconia base composite oxide of the present invention will be described. Specifically, the ceria-zirconia base composite oxide of the present invention is a ceria-zirconia base composite oxide comprising a composite oxide of ceria and zirconia. In the ceria-zirconia base composite oxide of the present invention, a content ratio between cerium and zirconium in the composite oxide is in a range from 43:57 to 48:52 in terms of molar ratio ([cerium]:[zirconium]). An intensity ratio of a diffraction line at $2\theta=14.5°$ to a diffraction line at $2\theta=29°$ (I(14/29) value) and an intensity ratio of a diffraction line at $2\theta=28.5°$ to the diffraction line at $2\theta=29°$ {I(28/29) value}, which are calculated from an X-ray diffraction pattern obtained by an X-ray diffraction measurement using CuKα after heating under a temperature condition of 1100° C. in air for 5 hours, respectively satisfy the following conditions:

I(14/29) value≥0.015, and
I(28/29) value≤0.08.

In the ceria-zirconia base composite oxide of the present invention, the content ratio between cerium and zirconium in the composite oxide needs to be in a range from 43:57 to 48:52 in terms of molar ratio ([cerium]:[zirconium]), more preferably in a range from 44:56 to 48:52. If the content ratio of cerium is below the lower limit, the reduction in the oxygen storage capacity due to enrichment of the composition with zirconium outweighs the effect of improving the stability of the composite oxide by suppression of phase separation of ceria. This causes an insufficient oxygen storage capacity after a high-temperature durability test. Meanwhile, if the content ratio of cerium exceeds the upper limit, the effect of improving the stability of the composite oxide by suppression of phase separation of ceria is not obtained. This makes an insufficient oxygen storage capacity after the high-temperature durability test.

Moreover, in the ceria-zirconia base composite oxide of the present invention, the above I(14/29) value needs to be 0.015 or larger, more preferably 0.017 or larger. If the I(14/29) value is below the lower limit, the percentage of the ordered phase maintained is low, this causes an insufficient oxygen storage capacity after the high-temperature durability test. The upper limit of the above I(14/29) value is not particularly limited. However, from the perspective that the I(14/29) value of a pyrochlore phase calculated from a PDF card (01-075-2694) is the upper limit, the upper limit of the I(14/29) value is preferably 0.05 or smaller.

Furthermore, in the ceria-zirconia base composite oxide of the present invention, the above I(28/29) value needs to be 0.08 or smaller, more preferably 0.06 or smaller, and particularly preferably 0.04 or smaller. If the I(28/29) value exceeds the upper limit, the phase separation of ceria is not sufficiently suppressed, this makes an insufficient oxygen storage capacity after the high-temperature durability test. Although the lower limit of the above I(28/29) value is not particularly limited, a smaller value is preferable.

In the ceria-zirconia base composite oxide of the present invention, a crystal phase (ordered phase) having an orderly arranged structure of cerium ions and zirconium ions is formed in the composite oxide. By forming such an ordered phase, the heat resistance at high temperature is improved, and a sufficiently high oxygen storage/release performance is exhibited even after exposure to high temperature. Further, in the ceria-zirconia base composite oxide of the present invention, the content ratio of the ordered phase to the total crystal phase calculated from the peak intensity ratio in the X-ray diffraction pattern is preferably 50 to 100%, more preferably 80 to 100%. If the content ratio of the ordered phase is below the lower limit, the heat resistance of the composite oxide tends to be reduced.

In addition, in the ceria-zirconia base composite oxide of the present invention, an average value of percentages of areas occupied by particles is preferably 50% or more, more preferably 54% or more, in a field of view (magnification 500×) of a scanning electron microscope. If the average value of percentages of areas occupied by particles is below the lower limit, excessive grain growth and transition in the crystal phase of particles are not sufficiently suppressed during the high-temperature durability test, and the oxygen storage capacity after the high-temperature durability test tends to be insufficient. The upper limit of the above average value of percentages of areas occupied by particles is not particularly limited. However, from the perspective that the particle size of a powder needs to be adjusted when a catalyst is actually prepared, the upper limit is preferably 98% or less.

Furthermore, in the ceria-zirconia base composite oxide of the present invention, an average value (number-based average value) of diameters of crystal grains is preferably 2.2 to 4.5 μm, more preferably 2.5 to 4.0 μm, in the field of view (magnification 500×) of the scanning electron microscope. If the average value of diameters of crystal grains is below the lower limit, a small crystal grain poor in stability as a crystal grows during the high-temperature durability test, a large number of the ordered phases disappear. Thereby, the oxygen storage capacity after the high-temperature durability test tends to be insufficient. Meanwhile, if the average value of diameters of crystal grains exceeds the upper limit, crystal growth excessively proceeds, and oxygen diffuses from the interior of the crystal to the surface thereof too slowly. Thereby, the oxygen storage/release amount (OSC) tends to be reduced.

Additionally, the ceria-zirconia base composite oxide of the present invention may further comprise at least one element selected from the group consisting of rare earth elements other than cerium and alkaline earth elements. By comprising such an element, when the ceria-zirconia base composite oxide of the present invention is used as a support of a catalyst for purification of exhaust gas, a higher purification performance of exhaust gas tends to be exhibited. Examples of such rare earth elements other than cerium include scandium (Sc), yttrium (Y), lanthanum (La), praseodymium (Pr), neodymium (Nd), samarium (Sm), gadolinium (Gd), terbium (Tb), dysprosium (Dy), ytterbium (Yb), lutetium (Lu), and the like. Above all, La, Nd, Pr, Y and Sc are preferable, and La, Y and Nd are more preferable from the perspective that when a noble metal is supported thereon, the interaction with the noble metal is enhanced and the affinity tends to be increased. Further, examples of the alkaline earth metal elements include magnesium (Mg), calcium (Ca), strontium (Sr), barium (Ba), and radium (Ra). Above all, Mg, Ca and Ba are preferable from the perspective that when a noble metal is supported thereon, the interaction with the noble metal is enhanced and the affinity tends to be increased. Such a rare earth element other than cerium or an alkaline earth metal element having a low electronegativity interacts strongly with a noble metal, and accordingly binds to the noble metal through oxygen in an oxidizing atmosphere, and vaporization and sintering of the noble metal are suppressed. Thus, there is a tendency that deterioration of the noble metal, which is an active site during purification of exhaust gas, can be suppressed sufficiently.

Moreover, when at least one element selected from the group consisting of rare earth elements other than cerium and alkaline earth elements is further comprised, the content of the element in the ceria-zirconia base composite oxide is preferably 1 to 20% by mass, more preferably 3 to 7% by mass. If the content of such an element is below the lower limit, when a noble metal is supported on the thus-obtained composite oxide, it tends to be difficult to improve the interaction with the noble metal sufficiently. Meanwhile, if the content exceeds the upper limit, the oxygen storage capacity tends to be reduced.

Furthermore, the specific surface area of such a ceria-zirconia base composite oxide is not particularly limited, but is preferably 0.1 to 2 $m^2/g$, more preferably 0.2 to 1 $m^2/g$. If such a specific surface area is below the lower limit, there are tendencies that the interaction with the noble metal is small, and that the oxygen storage capacity is small. Meanwhile, if the specific surface area exceeds the upper limit, there are tendencies that the number of particles having a small particle diameter is increased, and that the heat resistance is reduced. Note that such a specific surface area can be calculated as a BET specific surface area from an adsorption isotherm using the BET adsorption isotherm equation.

Next, description will be given of a method of the present invention for producing the ceria-zirconia base composite oxide of the present invention.

The method for producing the ceria-zirconia base composite oxide of the present invention is a method for producing a ceria-zirconia base composite oxide comprising a composite oxide of ceria and zirconia, the method comprising the step of:

obtaining the ceria-zirconia base composite oxide by compression-molding at a pressure of 400 to 3500 $kgf/cm^2$ a ceria-zirconia solid solution powder in which a content ratio between cerium and zirconium is in a range from 43:57 to 48:52 in terms of molar ratio ([cerium]:[zirconium]) (compression-molding step), followed by a reduction treatment under a temperature condition of 1450 to 2000° C. (reduction treatment step).

The solid solution powder of ceria and zirconia (ceria-zirconia solid solution powder) according to the present invention has a content ratio between cerium and zirconium in a range from 43:57 to 48:52 in terms of molar ratio ([cerium]:[zirconium]). If the content ratio of cerium in the ceria-zirconia solid solution powder used is below the lower limit, the reduction in the oxygen storage capacity of the obtained ceria-zirconia base composite oxide due to enrichment of the composition with zirconium outweighs the effect of improving the stability of the composite oxide by suppression of phase separation of ceria. This causes an insufficient oxygen storage capacity after the high-temperature durability test. Meanwhile, if the content ratio of cerium exceeds the upper limit, the obtained ceria-zirconia base composite oxide does not have the effect of improving the stability of the composite oxide by suppression of phase separation of ceria. This causes an insufficient oxygen storage capacity after the high-temperature durability test.

As such a ceria-zirconia solid solution powder, from the perspective of forming the ordered phase more sufficiently, a solid solution in which ceria and zirconia are mixed at an atomic level is preferably used. Moreover, such a solid solution powder of ceria and zirconia preferably has an average primary particle diameter of approximately 2 to 100 nm.

Additionally, a method for preparing such a ceria-zirconia solid solution powder is not particularly limited. An example thereof includes a method in which the solid solution powder is prepared by adopting a so-called coprecipitation method such that the content ratio between cerium and zirconium is within the above-described range; and so forth. As the coprecipitation method, an example thereof includes a method in which: an aqueous solution containing a salt (for example, nitrate salt) of cerium and a salt (for example, nitrate salt) of zirconium is used to form a coprecipitate in the presence of ammonia; the obtained coprecipitate is filtered, washed followed by drying and further by calcination, and crushed using a crusher such as a ball mill to obtain a solid solution powder of ceria and zirconia. Note that the aqueous solution containing a salt of cerium and a salt of zirconium is prepared in such a manner that the content ratio between cerium and zirconium in the obtained solid solution powder is within a predetermined range. Moreover, to such an aqueous solution, a salt of at least one element selected from the group consisting of rare earth elements other than cerium and alkaline earth elements, a surfactant (for example, nonionic surfactant), and the like may be added as necessary.

Next, each step will be described. In the present invention, firstly, the ceria-zirconia solid solution powder is compression-molded at a pressure of 400 to 3500 $kgf/cm^2$ (more preferably at a pressure of 500 to 3000 $kgf/cm^2$) (compression-molding step). If the pressure in such a compression-molding step is below the lower limit, the packing density of the powder is not sufficiently improved. Accordingly, crystal growth during the reduction treatment is not sufficiently promoted. As a result, the obtained ceria-zirconia base composite oxide has an insufficient oxygen storage capacity after the high-temperature durability test. Meanwhile, if the pressure in such a compression-molding step exceeds the upper limit, the phase separation of ceria is likely to proceed. As a result, the obtained ceria-zirconia base composite oxide has an insufficient oxygen storage capacity after the high-temperature durability test. Note that such a compression-molding method is not particularly limited, and a known compression-molding method such as isostatic pressing can be adopted as appropriate.

Next, in the present invention, the ceria-zirconia solid solution powder thus compression-molded is subjected to a reduction treatment under a temperature condition of 1450 to 2000° C. (more preferably, 1600 to 1900° C.) (reduction treatment step). Thus, the ceria-zirconia base composite oxide of the present invention is obtained. If the temperature condition in the reduction treatment is below the lower limit, the stability of the ordered phase is low. As a result, the obtained ceria-zirconia base composite oxide has an insufficient oxygen storage capacity after the high-temperature durability test. Meanwhile, if the temperature condition in the reduction treatment exceeds the upper limit, the balance between an energy (for example, electric power) required in the reduction treatment and the improvement in the performance is deteriorated.

In addition, the reduction treatment method is not particularly limited, as long as the method enables the solid solution powder to be subjected to a heat treatment under a predetermined temperature condition in a reducing atmosphere. Examples thereof include (i) a method in which the solid solution powder is placed in a vacuum furnace whose inside is then made vacuum, a reducing gas is caused to flow in the furnace to make the atmosphere inside the furnace a reducing atmosphere, and thus the reduction treatment is performed by heating under a predetermined temperature condition; (ii) a method in which a graphite furnace is used, the solid solution powder is placed in the furnace whose inside is then made vacuumed, heating is performed under a predetermined temperature condition to make the atmosphere inside the furnace a reducing atmosphere by reducing gases such as CO and HC generated from the furnace body, a heating fuel, and so on, and thus the reduction treatment is performed; and (iii) a method in which the solid solution powder is placed in a crucible filled with activated carbon, heating is performed under a predetermined temperature condition to make the atmosphere inside the crucible a reducing atmosphere by reducing gases such as CO and HC generated from the activated carbon and so on, and thus the reduction treatment is performed.

Reducing gases used to create such a reducing atmosphere are not particularly limited, and reducing gases such as CO, HC, $H_2$, and other hydrocarbon gases can be used as appropriate. Further, among such reducing gases, a reducing gas containing no carbon (C) is more preferably used from the perspective of preventing generation of a by-product such as zirconium carbide (ZrC) in a case of a reduction treatment at higher temperature. When such a reducing gas containing no carbon (C) is used, a reduction treatment is possible under a higher temperature condition that is approximate to the melting point of zirconium or the like. This makes it possible to sufficiently improve the structural stability of the crystal phase.

Additionally, the heating time in such a reduction treatment is not particularly limited, but is preferably approximately 0.5 to 5 hours. If such a heating time is shorter than the lower limit, the solid solution powder tends not to have a sufficiently large diameter of a crystal grain. Meanwhile, if the heating time exceeds the upper limit, grain growth proceeds sufficiently, making further operations no longer necessary. Accordingly, the economic efficiency tends to be reduced.

In the present invention, after the reduction treatment step, the ceria-zirconia base composite oxide is preferably further subjected to an oxidation treatment (oxidation treatment step). By performing such an oxidation treatment, the loss in oxygen during the reduction is compensated in the obtained ceria-zirconia base composite oxide, and the stability as the oxide powder tends to be improved.

Such an oxidation treatment method is not particularly limited. For example, a method in which the ceria-zirconia base composite oxide is heated an oxidizing atmosphere (for example, air) can be preferably adopted. Moreover, the heating temperature condition in such an oxidation treatment is not particularly limited, but is preferably approximately 300 to 800° C. Further, the heating time in the oxidation treatment is not particularly limited, either, but is preferably approximately 0.5 to 5 hours.

Hereinabove, the ceria-zirconia base composite oxide and the method for producing the same of the present invention have been described. Hereinafter, description will be given of a catalyst for purification of exhaust gas using the ceria-zirconia base composite oxide of the present invention.

The catalyst for purification of exhaust gas of the present invention comprises the ceria-zirconia base composite oxide of the present invention. Such a catalyst for purification of exhaust gas of the present invention has the oxygen storage/release performance of the comprised ceria-zirconia base composite oxide sufficiently retained, even when used under high temperature conditions, and thus exhibits a high catalytic activity.

A preferred example of such a catalyst for purification of exhaust gas of the present invention is a catalyst for purification of exhaust gas comprising a support containing the ceria-zirconia base composite oxide of the present invention and a noble metal supported on the support. Examples of such a noble metal include platinum, rhodium, palladium, osmium, iridium, gold, silver, and the like. Additionally, a method of supporting the noble metal on such a support is not particularly limited, and known methods can be adopted as appropriate. For example, it is possible to adopt a method in which: a solution is prepared in advance by dissolving a salt (nitrate salt, chloride, acetate salt, or the like) of the noble metal or a complex of the noble metal in a solvent such as water and alcohol; a powder of the ceria-zirconia base composite oxide (support) is immersed in the solution; and the solvent is removed followed by calcination. Further, the amount of the noble metal supported on the support is not particularly limited, as long as the noble metal is appropriately supported in an amount required according to the targeted design or the like. The amount is preferably 0.01% by mass.

Furthermore, another preferred example of the catalyst for purification of exhaust gas of the present invention is a catalyst for purification of exhaust gas in which the ceria-zirconia base composite oxide of the present invention is disposed around a first catalyst comprising a micro-particulate catalyst support and a noble metal supported on the micro-particulate catalyst support. Such a micro-particulate catalyst support is not particularly limited, and it is possible to use as appropriate a support formed of a metal oxide or a metal oxide composite useable as a support for a catalyst for purification of exhaust gas (for example, alumina particles, alumina/ceria particles, alumina/ceria/zirconia particles, and the like). In addition, the average particle diameter of such a micro-particulate catalyst support is not particularly limited, but is preferably 5 to 100 nm. Further, as a method of supporting the noble metal on such a micro-particulate catalyst support, the aforementioned method can be adopted. Moreover, the amount of the noble metal supported on the micro-particulate catalyst support is not particularly limited, as long as the noble metal is appropriately supported in an amount required according to the targeted design or the like. The amount is preferably 0.01% by mass. Additionally, a method of disposing the ceria-zirconia base composite oxide of the present invention around such a first catalyst is not particularly limited. For example, it is possible to adopt a method in which the first catalyst is mixed with the ceria-zirconia base composite oxide of the present invention. Furthermore, from the perspective of obtaining a higher catalytic activity, the ceria-zirconia base composite oxide of the present invention is preferably disposed around the first catalyst in a highly dispersed manner.

EXAMPLES

Hereinafter, the present invention will be described more concretely on the basis of Examples and Comparative Examples. However, the present invention is not limited to the following Examples.

Example 1

A ceria-zirconia solid solution powder in which a content ratio between cerium and zirconium was 43:57 in terms of molar ratio ([cerium]:[zirconium]) was prepared as follows. Specifically, first, 423 g of an aqueous solution containing cerium nitrate in an amount of 28% by mass in terms of $CeO_2$, 624 g of an aqueous solution containing zirconium oxynitrate in an amount of 18% by mass in terms of $ZrO_2$, and 86 g of an aqueous solution containing hydrogen peroxide in 1.1 times the molar amount of cerium to be contained were added to 856 g of an aqueous solution containing ammonia in 1.2 times the amount equivalent to the neutralization equivalent to form a coprecipitate. The coprecipitate thus obtained was centrifuged and washed (with ion-exchange water). Next, the obtained coprecipitate was dried at 110° C. for not shorter than 10 hours, and then subjected to calcination at 400° C. in air for 5 hours to obtain a solid solution of cerium and zirconium. Thereafter, the solid solution was crushed to the grain diameter of 75 µm or smaller using a crusher (manufactured from AS ONE Corporation, product name "Wonder Blender") and with a sieve. Thus, the ceria-zirconia solid solution powder was obtained.

Next, 20 g of the obtained ceria-zirconia solid solution powder was packed into a polyethylene bag (volume, 0.05 L) whose inside was then deaerated. After that, the mouth of the bag was heated and sealed. Subsequently, using an isostatic pressing machine (manufactured by NIKKISO CO., LTD., product name "CK4-22-60"), the bag was molded by isostatic pressing (CIP) at a pressure of 1000 kgf/cm² (molding pressure) for 1 minute. Thus, a compact of the ceria-zirconia solid solution powder was obtained. The size of the compact was: a length of 4 cm, a width of 4 cm, and an average thickness of 7 mm, and the weight was approximately 20 g.

Next, the compacts (five sheets) thus obtained were placed in a crucible (internal volume: a diameter of 8 cm, a height of 7 cm) filled with 70 g of activated carbon, which was then covered with a lid. After that, the crucible was put into a high speed heating electric furnace, and heated up to 1000° C. in the heating period of 1 hour, then heated up to 1700° C. (reduction treatment temperature) in the heating period of 4 hours, maintained for 5 hours, followed by cooling down to 1000° C. in the cooling period of 4 hours and natural cooling to room temperature. Thus, a reduction treatment product was obtained.

Next, the obtained reduction treatment product was oxidized by heating under a temperature condition of 500° C. in air for 5 hours to thus obtain a ceria-zirconia base composite oxide. A content ratio between cerium and zirconium in the composite oxide is 43:57 in terms of molar ratio ([cerium]:[zirconium]). The ceria-zirconia base composite oxide thus obtained was crushed into 75 µm or smaller with a sieve to form a powder having an average particle diameter of 20 µm.

<X-Ray Diffraction (XRD) Measurement>

The obtained ceria-zirconia base composite oxide was subjected to a heat treatment at 1100° C. in air for 5 hours (high-temperature durability test). The crystal phase of the ceria-zirconia base composite oxide after the treatment was measured by an X-ray diffraction method. Note that the X-ray diffraction pattern was determined with the X-ray diffractometer manufactured by Rigaku Corporation under the product name "RINT-2100," and the I(14/29) value and the I(28/29) value were calculated. Table 1 shows the obtained result.

<Observation with Scanning Electron Microscope (SEM)>

Figure 1:
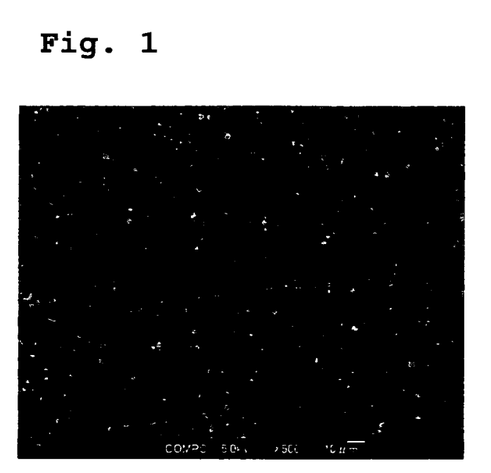
FIG. 1 is a scanning electron microscope photograph showing a grain boundary image of a ceria-zirconia base composite oxide obtained in Example 1 within a single field of view.

The cross section of the obtained ceria-zirconia base composite oxide was observed with a scanning electron microscope (SEM), and the average value of percentages of areas occupied by particles and the average value of diameters of crystal grains were calculated. Note that the scanning electron microscope manufactured by JEOL Ltd. under the product name "JSM-7000F" was used. Table 1 shows the obtained result. In addition, FIG. 1 shows a scanning electron microscope photograph (magnification 500×, backscattered electron image) showing a grain boundary image of the ceria-zirconia base composite oxide obtained in Example 1 within a single field of view.

<Measurement Test on Oxygen Storage/Release Amount>

A pellet-shaped catalyst for purification of exhaust gas having a diameter of 0.5 mm was obtained by supporting Pt (0.2% by mass) on 15 g of the ceria-zirconia base composite oxide after the high-temperature durability test using 200 mL of an aqueous solution of $Pt(NO_2)_2(NH_3)_2$ (Pt concentration: 0.15 g/L).

A quartz reaction tube (internal volume: a diameter of 1.7 cm, a length of 9.5 cm) was filled with 1 g of the obtained catalyst, through which a rich gas (CO (2% by volume)+$N_2$ (balance)) and a lean gas ($O_2$ (1% by volume)+$N_2$ (balance)) were alternately caused to flow for every three minutes one at a time in a fixed bed flow reactor. The oxygen storage/release amount (OSC) was calculated from the amount of $CO_2$ generated in a rich gas atmosphere. Note that the gas flow rate was 10 L/min, the evaluation was made at a temperature of 500° C., and the analyzer manufactured by Best Instruments Co., Ltd. under the product name "Bex5900Csp" was used. Table 1 shows the obtained result.

Example 2

Except that the amount of an aqueous solution containing cerium nitrate in an amount of 28% by mass in terms of $CeO_2$ and the amount of an aqueous solution containing zirconium oxynitrate in an amount of 18% by mass in terms of $ZrO_2$ were respectively 443 g and 602 g, a ceria-zirconia solid solution powder was obtained in the same manner as in Example 1. A content ratio between cerium and zirconium in the solid solution powder was 45:55 in terms of molar ratio ([cerium]:[zirconium]). Next, a ceria-zirconia base composite oxide was obtained in the same manner as in Example 1. A content ratio between cerium and zirconium in the composite oxide was 45:55 in terms of molar ratio ([cerium]:[zirconium]). The obtained ceria-zirconia base composite oxide was subjected to the X-ray diffraction measurement, the observation with a scanning electron microscope, and the measurement test on the oxygen storage/release amount in the same manner as in Example 1. Table 1 shows the obtained result.

Example 3

Except that the amount of an aqueous solution containing cerium nitrate in an amount of 28% by mass in terms of $CeO_2$ and the amount of an aqueous solution containing zirconium oxynitrate in an amount of 18% by mass in terms of $ZrO_2$ were respectively 472 g and 570 g, a ceria-zirconia solid solution powder was obtained in the same manner as in Example 1. A content ratio between cerium and zirconium in the solid solution powder was 48:52 in terms of molar ratio ([cerium]:[zirconium]). Next, a ceria-zirconia base composite oxide was obtained in the same manner as in Example 1. A content ratio between cerium and zirconium in the composite oxide was 48:52 in terms of molar ratio ([cerium]:[zirconium]). The obtained ceria-zirconia base composite oxide was subjected to the X-ray diffraction measurement, the observation with a scanning electron microscope, and the measurement test on the oxygen storage/release amount in the same manner as in Example 1. Table 1 shows the obtained result.

Examples 4-6

Except that the molding pressures were respectively 500 kgf/cm² (Example 4), 2000 kgf/cm² (Example 5), and 3000 kgf/cm² (Example 6), ceria-zirconia base composite oxides were obtained in the same manner as in Example 2. The obtained ceria-zirconia base composite oxides were subjected to the X-ray diffraction measurement, the observation with a scanning electron microscope, and the measurement test on the oxygen storage/release amount in the same manner as in Example 1. Table 1 shows the obtained results.

Examples 7-8

Except that the reduction treatment temperatures were respectively 1600° C. (Example 7) and 1500° C. (Example 8), ceria-zirconia base composite oxides were obtained in the same manner as in Example 2. The obtained ceria-zirconia base composite oxides were subjected to the X-ray diffraction measurement, the observation with a scanning electron microscope, and the measurement test on the oxygen storage/release amount in the same manner as in Example 1. Table 1 shows the obtained results.

Comparative Example 1

Except that the amount of an aqueous solution containing cerium nitrate in an amount of 28% by mass in terms of $CeO_2$ and the amount of an aqueous solution containing zirconium oxynitrate in an amount of 18% by mass in terms of $ZrO_2$ were respectively 413 g and 635 g, a ceria-zirconia solid solution powder was obtained in the same manner as in Example 1. A content ratio between cerium and zirconium in the solid solution powder was 42:58 in terms of molar ratio ([cerium]:[zirconium]). Next, a ceria-zirconia base composite oxide was obtained in the same manner as in Example 1. A content ratio between cerium and zirconium in the composite oxide was 42:58 in terms of molar ratio ([cerium]:[zirconium]). The obtained ceria-zirconia base composite oxide was subjected to the X-ray diffraction measurement, the observation with a scanning electron microscope, and the measurement test on the oxygen storage/release amount in the same manner as in Example 1. Table 1 shows the obtained result.

Comparative Example 2

Except that the amount of an aqueous solution containing cerium nitrate in an amount of 28% by mass in terms of $CeO_2$ and the amount of an aqueous solution containing zirconium oxynitrate in an amount of 18% by mass in terms of $ZrO_2$ were respectively 492 g and 548 g, a ceria-zirconia solid solution powder was obtained in the same manner as in Example 1. A content ratio between cerium and zirconium in the solid solution powder was 50:50 in terms of molar ratio ([cerium]:[zirconium]). Next, a ceria-zirconia base composite oxide was obtained in the same manner as in Example 1. A content ratio between cerium and zirconium in the composite oxide was 50:50 in terms of molar ratio ([cerium]:[zirconium]). The obtained ceria-zirconia base composite oxide was subjected to the X-ray diffraction measurement, the observation with a scanning electron microscope, and the measurement test on the oxygen storage/release amount in the same manner as in Example 1. Table 1 shows the obtained result.

Comparative Examples 3-4

Figure 2:
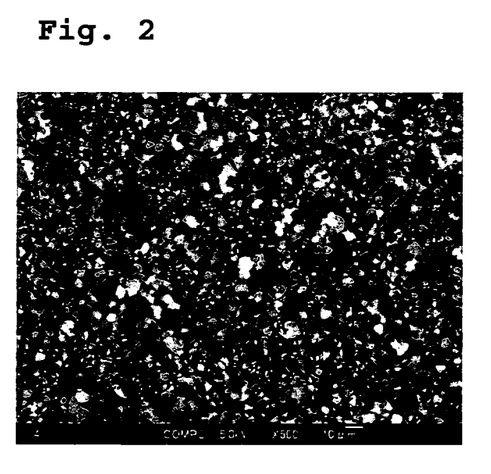
FIG. 2 is a scanning electron microscope photograph showing a grain boundary image of a ceria-zirconia base composite oxide obtained in Comparative Example 3 within a single field of view.

Except that the molding pressures were respectively 250 kgf/cm² (Comparative Example 3) and 4000 kgf/cm² (Comparative Example 4), ceria-zirconia base composite oxides were obtained in the same manner as in Example 2. The obtained ceria-zirconia base composite oxide were subjected to the X-ray diffraction measurement, the observation with a scanning electron microscope, and the measurement test on the oxygen storage/release amount in the same manner as in Example 1. Table 1 shows the obtained results. In addition, FIG. 2 shows a scanning electron microscope photograph (magnification 500×, backscattered electron image) showing a grain boundary image of the ceria-zirconia base composite oxide obtained in Comparative Example 3 within a single field of view.

Comparative Example 5

Except that the reduction treatment temperature was 1400° C., a ceria-zirconia base composite oxide was obtained in the same manner as in Example 2. The obtained ceria-zirconia base composite oxide was subjected to the X-ray diffraction measurement, the observation with a scanning electron microscope, and the measurement test on the oxygen storage/release amount in the same manner as in Example 1. Table 1 shows the obtained result.

TABLE 1

| | Ce/Zr ratio [molar ratio] | | Molding pressure | Reduction treatment temperature | I(14/29) value | I(28/29) value | Oxygen storage/release amount (OSC)@500° C. | Average value of percentages of areas occupied by particles | Average value of diameters of crystal grains |
|---|---|---|---|---|---|---|---|---|---|
| | Ce | Zr | [Kgf/cm2] | [° C.] | | | [μmol/g] | [%] | [μm] |
| Example 1 | 43 | 57 | 1000 | 1700 | 0.024 | 0.004 | 700 | 57.6 | 3.2 |
| Example 2 | 45 | 55 | 1000 | 1700 | 0.027 | 0.007 | 735 | 54 | 3.1 |
| Example 3 | 48 | 52 | 1000 | 1700 | 0.029 | 0.009 | 689 | 60.2 | 3 |
| Example 4 | 45 | 55 | 500 | 1700 | 0.021 | 0.008 | 668 | 59.5 | 3.2 |
| Example 5 | 45 | 55 | 2000 | 1700 | 0.025 | 0.006 | 716 | 58.5 | 3.3 |
| Example 6 | 45 | 55 | 3000 | 1700 | 0.021 | 0.01 | 676 | 64.2 | 3.8 |
| Example 7 | 45 | 55 | 1000 | 1600 | 0.017 | 0.004 | 710 | 60.1 | 2.6 |
| Example 8 | 45 | 55 | 1000 | 1500 | 0.015 | 0.001 | 660 | 61.5 | 2.3 |

TABLE 1-continued

| | Ce/Zr ratio [molar ratio] | | Molding pressure | Reduction treatment temperature | I(14/29) value | I(28/29) value | Oxygen storage/release amount (OSC)@500° C. | Average value of percentages of areas occupied by particles | Average value of diameters of crystal grains |
|---|---|---|---|---|---|---|---|---|---|
| | Ce | Zr | [Kgf/cm2] | [° C.] | | | [μmol/g] | [%] | [μm] |
| Comparative Example 1 | 42 | 58 | 1000 | 1700 | 0.014 | 0.004 | 650 | 56.8 | 3.3 |
| Comparative Example 2 | 50 | 50 | 1000 | 1700 | 0.031 | 0.086 | 645 | 55.2 | 3.4 |
| Comparative Example 3 | 45 | 55 | 250 | 1700 | 0.020 | 0.089 | 622 | 38.7 | 2.1 |
| Comparative Example 4 | 45 | 55 | 4000 | 1700 | 0.034 | 0.086 | 583 | 72.1 | 4.6 |
| Comparative Example 5 | 45 | 55 | 1000 | 1400 | 0.001 | 0.001 | 438 | 49.9 | 3.4 |

As apparent from the comparison between the results of Examples 1 to 3 and the results of Comparative Examples 1 and 2 shown in Table 1, it was confirmed that as a ceria-zirconia base composite oxide becomes a composition richer in zirconium in the content ratio between cerium and zirconium, the I(28/29) value tends to be smaller, and the phase separation of ceria is suppressed. In addition, the followings were confirmed. As the composition becomes richer in zirconium, the I(14/29) value is slightly reduced. Nonetheless, in the cases where the content ratio between cerium and zirconium in the composite oxide is in a range from 43:57 to 48:52 in terms of molar ratio ([cerium]:[zirconium]) (Examples 1 to 3), the oxygen storage/release amount (OSC) is significantly improved, the effect of improving the stability of the ceria-zirconia base composite oxide by suppression of phase separation of ceria outweighs the influence from reduction in ordered phase.

Moreover, as apparent from the comparison between the results of Examples 4 to 6 and the results of Comparative Examples 3 and 4 shown in Table 1, the followings were confirmed. When the molding pressure is in a range from 400 to 3500 kgf/cm² (Examples 4 to 6), the packing density of the powder is appropriately increased, crystal growth during the reduction treatment is promoted, and the stability as a crystal is improved. As a result, the obtained ceria-zirconia base composite oxide has an improved oxygen storage/release amount. Meanwhile, it was confirmed that if the molding pressures is too high (Comparative Example 4), the phase separation of ceria proceeds, and the oxygen storage/release amount is reduced.

Furthermore, as apparent from the comparison between the results of Examples 2, 7 and 8, and the result of Comparative Example 5 shown in Table 1, it was confirmed that when the reduction treatment temperature is in a range from 1450 to 2000° C. (Examples 2, 7 and 8), the stability of ordered phase is high in the obtained ceria-zirconia base composite oxide. As a result, the obtained ceria-zirconia base composite oxide has an improved oxygen storage/release amount.

INDUSTRIAL APPLICABILITY

As described above, according to the present invention, it is possible to provide a ceria-zirconia base composite oxide, a method for producing the same, and a catalyst for purification of exhaust gas using the ceria-zirconia base composite oxide, the ceria-zirconia base composite oxide having sufficiently higher heat resistance and being capable of exhibiting more sufficiently excellent oxygen storage capacity even after exposure to high temperature for an extended period of time than a conventional ceria-zirconia base composite oxide obtained by adopting a production method as described in Patent Literature 5 above.

Since having such excellent heat resistance, the ceria-zirconia base composite oxide of the present invention can be favorably utilized as a support, a co-catalyst, and the like of a catalyst for purification of exhaust gas used under relatively high temperature conditions of 300° C. or higher. Moreover, the catalyst using the ceria-zirconia base composite oxide of the present invention tends to have an improved low temperature performance and is also capable of reducing emission (especially, NOx emission).

The invention claimed is:

1. A ceria-zirconia base composite oxide comprising a composite oxide of ceria and zirconia, wherein
    a content ratio between cerium and zirconium in the composite oxide is in a range from 43:57 to 48:52 in terms of molar ratio ([cerium]:[zirconium]),
    an average value (number-based average value) of diameters of crystal grains is 2.2 to 4.5 μm in a field of view (magnification 500×) of a scanning electron microscope, and
    an intensity ratio of a diffraction line at 2θ=14.5° to a diffraction line at 2θ=29° {I(14/29) value} and an intensity ratio of a diffraction line at 2θ=28.5° to the diffraction line at 2θ=29° {I(28/29) value}, which are calculated from an X-ray diffraction pattern obtained by an X-ray diffraction measurement using CuKα after heating under a temperature condition of 1100° C. in air for 5 hours, respectively satisfy the following conditions:
    I(14/29) value≥0.015, and
    I(28/29) value≤0.08.

2. The ceria-zirconia base composite oxide according to claim 1, wherein a crystal phase having an orderly arranged structure of cerium ions and zirconium ions is formed in the composite oxide.

3. The ceria-zirconia base composite oxide according to claim 1, wherein an average value of percentages of areas occupied by particles of the composite oxide of ceria and zirconia is 50% or more in a field of view (magnification 500×) of a scanning electron microscope.

4. A method for producing a ceria-zirconia base composite oxide according to claim 1, the method comprising the step of:
    obtaining the ceria-zirconia base composite oxide by compression-molding at a pressure of 40 to 350 MPa (400 to 3500 kgf/cm²) a ceria-zirconia solid solution powder in which a content ratio between cerium and zirconium is in a range from 43:57 to 48:52 in terms of molar ratio ([cerium]:[zirconium]), followed by a reduction treatment under a temperature condition of 1450 to 2000° C.

5. The method for producing a ceria-zirconia base composite oxide according to claim 4, further comprising a step of, after the reduction treatment,
   subjecting the ceria-zirconia base composite oxide to an oxidation treatment.

6. The method for producing a ceria-zirconia base composite oxide according to claim 4, wherein a crystal phase having an orderly arranged structure of cerium ions and zirconium ions is formed in the composite oxide.

7. The method for producing a ceria-zirconia base composite oxide according to claim 4, wherein the ceria-zirconia base composite oxide has an average value of percentages of areas occupied by particles being 50% or more in a field of view (magnification 500×) of a scanning electron microscope.

8. A catalyst for purification of exhaust gas, comprising the ceria-zirconia base composite oxide according to claim 1.

9. The catalyst for purification of exhaust gas according to claim 8, wherein a crystal phase having an orderly arranged structure of cerium ions and zirconium ions is formed in the composite oxide.

10. The catalyst for purification of exhaust gas according to claim 8, wherein an average value of percentages of areas occupied by particles of the composite oxide of ceria and zirconia is 50% or more in a field of view (magnification 500×) of a scanning electron microscope.

\* \* \* \* \*